(12) United States Patent
Min

(10) Patent No.: US 11,788,639 B2
(45) Date of Patent: Oct. 17, 2023

(54) FITTING DEVICE AND SERVICE VALVE INCLUDING THE SAME

(71) Applicant: Byung Soo Min, Seoul (KR)

(72) Inventor: Byung Soo Min, Seoul (KR)

(73) Assignee: Byung Soo Min, South (KR)

( * ) Notice: Subject to any disclaimer, the term of this patent is extended or adjusted under 35 U.S.C. 154(b) by 0 days.

(21) Appl. No.: 17/050,839

(22) PCT Filed: Aug. 19, 2020

(86) PCT No.: PCT/KR2020/011059
§ 371 (c)(1),
(2) Date: Oct. 27, 2020

(87) PCT Pub. No.: WO2021/066320
PCT Pub. Date: Apr. 8, 2021

(65) Prior Publication Data
US 2022/0221077 A1    Jul. 14, 2022

(30) Foreign Application Priority Data

Sep. 30, 2019  (KR) .......................... 10-2019-0120868

(51) Int. Cl.
*F16L 37/091* (2006.01)
*F16K 27/00* (2006.01)
*F16K 31/60* (2006.01)
*F16L 41/16* (2006.01)

(52) U.S. Cl.
CPC .............. *F16K 27/00* (2013.01); *F16K 31/60* (2013.01); *F16L 41/16* (2013.01); *F16L 2201/10* (2013.01)

(58) Field of Classification Search
CPC . F16L 41/12; F16L 41/16; F16L 41/02; F16L 41/14; F16L 37/091; F16L 37/0915; F16L 37/092; F16L 37/0925; F16L 37/28; F16L 37/098; F16L 37/0982
See application file for complete search history.

(56) References Cited

U.S. PATENT DOCUMENTS 5,320,326 A * 6/1994 Ju ...................... F16L 37/0915
251/149.6

* cited by examiner

*Primary Examiner* — Aaron M Dunwoody

(57) ABSTRACT

Disclosed is a service valve including a service valve unit with a valve handle exposed to the outside and a fitting device provided with a fitting housing coupled to the service valve unit at one end of the fitting housing, and more particularly, the present invention provides the service valve including the fitting device, characterized in that the fitting housing includes an outer thread formed by a predetermined length on an outer ring at the other end of the fitting housing, and a first inner boss protruding from the other end at a predetermined depth, in addition, the fitting device includes: a cap handle screwed to the outer thread of the fitting housing; a ring lock washer spring seated on the first inner boss; and a sleeve fitted into an inner bore of the other end and interposed between the ring lock washer spring and the cap handle, wherein the sleeve moves and presses the ring lock washer spring by rotation of the cap handle to expand a diameter of the inner bore, so as to dismantle a pipe previously inserted in the fitting device.

2 Claims, 17 Drawing Sheets

(a)

(b)

(a)

(b)

(a)

(b)

(a)

(b)

(a)

(b)

(c)

(d)

FITTING DEVICE AND SERVICE VALVE INCLUDING THE SAME

FIELD OF INVENTION

The present invention relates to a fitting device that is easy to fasten and dismantle a pipe and a service valve including the same, and more particularly, to a fitting device for a copper pipe joint commonly used as an air conditioning component for air conditioning circulation, as well as a service valve including the same.

BACKGROUND OF INVENTION

Fitting accessories are generally used and fittings are diversely used throughout the world to serve as a joint to pipes (or hoses) (hereinafter referred to as "pipes") from metal pipes or urethane hoses to water purifier hoses.

FIGS. 1(a) and 1(b) illustrate a conventional fitting device.

As shown in FIG. 1(a), when dismantling or separating a pipe 1 that was previously inserted ("pre-inserted pipe"), the conventional fitting device 2 expands an inner diameter of an inner bore lock washer spring by pressing both ends of the fitting device so as to remove the pipe that has been gripped (or fixed). However, in this process, both ends of the fitting device 2, that is, a circular periphery should be continuously pressed until the pipe is released and, if force is applied to only one side of the periphery, an inner diameter of a ring lock washer spring cannot be evenly expanded in overall directions and causes an inconvenience in that the pipe 1 is not easy to remove.

In order to overcome such inconvenience, as shown in FIG. 1(b), a C-shaped tool 3 is used as a washer such that the tool is fitted into the pre-inserted pipe 1, followed by evenly applying force to both sides of the circular periphery at the end of the fitting device 2, in order to separate the pipe 1. However, the C-shaped tool 3 should be carried and managed along with different types or pipe diameters of the pipe 1 and, if the C-shaped tool 3 is lost or not carried, there is a problem of considerable inconvenience in removing the pipe 1. Further, for most of the fitting devices 2, when the pipe 1 is inserted into the fitting device, the pipe is often scratched by the ring lock washer spring and the repeatedly scratched pipe 1 is easily released even without applied force, hence causing a problem in that the pipe must be inserted after cutting out an end of the inserted portion of the pipe.

In general, an element for cooling is used for air conditioning in a cycle of compression-condensation-expansion-evaporation, wherein gas is introduced through a service valve and heat-exchange type air conditioning is performed by interaction between an indoor unit and an outdoor unit.

Herein, with regard to the service valve with reference to FIG. 2(a), attachment of a pipe E to a conventional air-conditioning service valve A is implemented using the service valve A and threads of a thread nipple B included in the service valve rather than any fitting device. More particularly, after expanding the pipe E in a trumpet shape (C) by means of an expansion tool, the service valve A and the pipe E are fastened to each other using nuts corresponding to the thread nipple B while tightening and turning the nuts D.

As shown in FIG. 2(b), when the air-conditioning service valve A shown in FIG. 2(a) is installed on the outdoor unit, an inconvenient operation of pipe expansion is required in order to modify the pipe E into a trumpet (C) shape at both of the indoor unit side and the outdoor unit side. Further, in order to fasten the pipe E with a nipple integrally with an evaporator at the indoor unit side, the trumpet-shaped (C) pipe E should be tightened with a monkey spanner using a nut D, which is a cumbersome operation.

Further, as shown in FIG. 2(a), the service valve A at the outdoor unit side has a configuration such that a fluid (gas) is blocked by fitting a hexagonal wrench G into a hexagonal groove of a valve nut F and turning the same, so as to control flow thereof. As shown in the figures, the hexagonal wrench G is a "¬"-shaped wrench but a worker must carry different types and sizes of wrenches.

In other words, since the outdoor unit installed on an outer wall of a high-rise building has insufficient space between the unit and the outer wall, the valve nut F and the outer wall are too close to each other, and thus, a wrench in a straight form cannot be inserted into the hexagonal groove. Therefore, different types of "¬"-shaped wrenches must be carried.

Under such background, with regard to fastening the service valve A with the pipe E at the outdoor unit side, due to a narrow space depending upon conditions of the working environment, the nut D may not be tightened and turned even using a small monkey spanner. In such case, it is inevitable that the worker pokes the body out of a window (or door) when working on a banister, high floors, exterior walls, etc. In this case, if the worker accidentally drops a tool, the tool may hit a pedestrian's head or fall onto a passenger car bonnet. Worse still, there are cases where workers having tried to fasten the service valve A with the pipe E on the 20$^{th}$ floor of an apartment building fell to their death. As such, the above operation entails serious risk.

Accordingly, there is an urgent need for technical embodiments to solve the aforementioned problems.

The present inventors have invented a fitting device for easy insertion and removal of a pipe and a service valve including the same (Korean Patent Registration No. 1900927) and further proposed a fitting device for easy fastening and dismantling of a pipe in an alternative manner.

SUMMARY OF INVENTION

Technical Problem to be Solved

The present disclosure has been devised to overcome the aforementioned problems and reduce accident factors during work, and an object of the present invention is to provide a fitting device for easily, safely and conveniently fastening and dismantling a pipe, as well as a service valve including the same.

Technical Solution

With regard to a service valve that includes a service valve unit 100 having a valve handle 137 exposed to the outside and a fitting device 200 provided with a fitting housing 120 coupled to the service valve unit 100 at one end of the fitting housing, the present invention provides a service valve including a fitting device, characterized in that a fitting housing 120 may have an outer thread formed by a predetermined length on an outer ring at the other end of the fitting housing, and a first inner boss protruding from the other end at a predetermined depth, in addition, the fitting device 200 may include: a cap handle 50 screwed to the outer thread of the fitting housing 120; a ring lock washer spring 25 seated on the first inner boss; and a sleeve 35 fitted into an inner bore of the other end and interposed between the ring lock washer spring 25 and the cap handle 50, wherein the sleeve 35 moves and presses the ring lock washer spring 25 by rotation of the cap handle 50 to expand a diameter of the inner bore ("inner diameter"), so as to dismantle a pipe 165 previously inserted ("pre-inserted pipe") in the fitting device 200.

According to one embodiment, the fitting housing 120 may include an inner thread formed by a predetermined length at the inner bore of the other end, wherein the first inner boss protrudes from the innermost side of the inner thread and the ring lock washer spring 25 is seated on the first inner boss, and the fitting device 200 may further include a guide ring nut 30 screwed to the inner thread to fix the ring lock washer spring 25.

According to one embodiment, the fitting housing 120 may include a second inner boss protruding at a predetermined depth from the first inner boss toward the service valve, and the fitting device 200 may include: a support ring 20 which is seated on the second inner boss and comes into contact with an end of the pre-inserted pipe 165 to block further entry of the pipe 165; and a rubber packing 10 interposed between the support ring 20 and the ring lock washer spring 25, an end of which is tapered to be in contact with tapered teeth protruding from an inner diameter of the ring lock washer spring 25.

According to one embodiment, the support ring 20 may include at least one gas inlet perforated on an outer circumference thereof, and the rubber packing 10 may be formed in a tapered tubular shape having an outer diameter increasing toward the service valve, which is provided with a gas compression groove on a thickness surface at the service valve side, wherein a portion of gas introduced from the service valve presses the gas compression groove through the gas inlet, so as to improve air-tightness between the rubber packing 10 and the ring lock washer spring or increase fastening force between the ring lock washer spring 25 and the pipe 165.

In addition, the present invention provides a fitting device 200 capable of dismantling a pipe 165 previously inserted into the fitting device 200, including: a fitting housing 120 which includes an outer thread formed by a predetermined length on an outer ring at the other end thereof and a first inner boss protruding at a predetermined depth from the other end; a cap handle 50 screwed to the outer thread of the fitting housing 120; a ring lock washer spring 25 seated on the first inner boss; and a sleeve 35 which is fitted into an inner bore at the other end of the fitting housing 120 and interposed between the ring lock washer spring 25 and the cap handle 50, wherein the sleeve 35 moves and presses the ring lock washer spring 25 by rotation of the cap handle 50 so as to expand a diameter of the inner bore, that is, an inner diameter.

Effect of Invention

The fitting device and the service valve including the same according to the present invention may exhibit effects of fastening or dismantling a pipe only by rotating the cap handle without scratching an outer surface of the pipe, even though a periphery of both ends of the fitting device is not continuously pressed as in the prior art and even if no further tool is carried and used.

In addition, the present invention can control a fluid (gas) by simply turning the valve handle even in a narrow space without loosening the nut.

DETAILED DESCRIPTION OF PREFERRED EMBODIMENTS OF INVENTION

Figure 1:
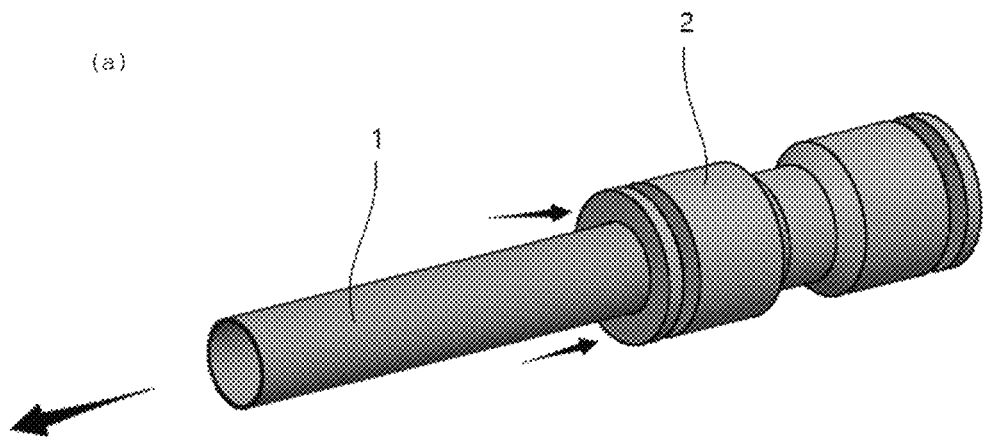
FIGS. 1(a) and 1(b) illustrate a conventional fitting device.
Figure 1:
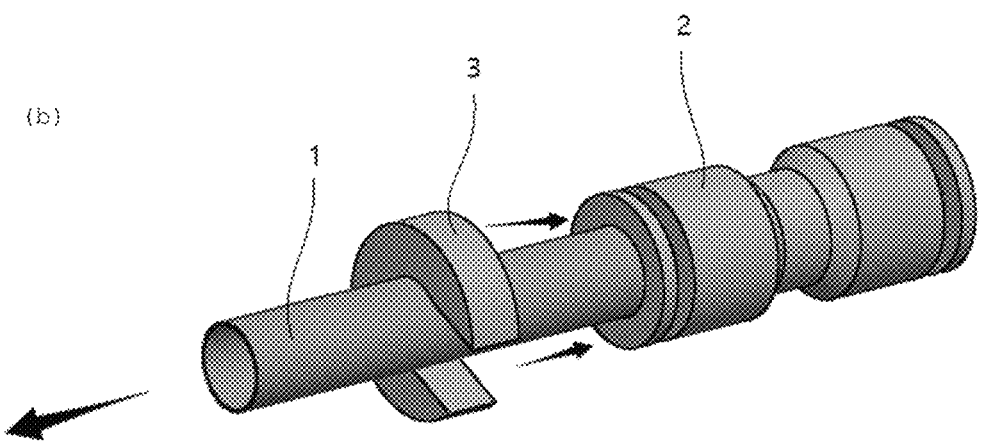
Figure 2:
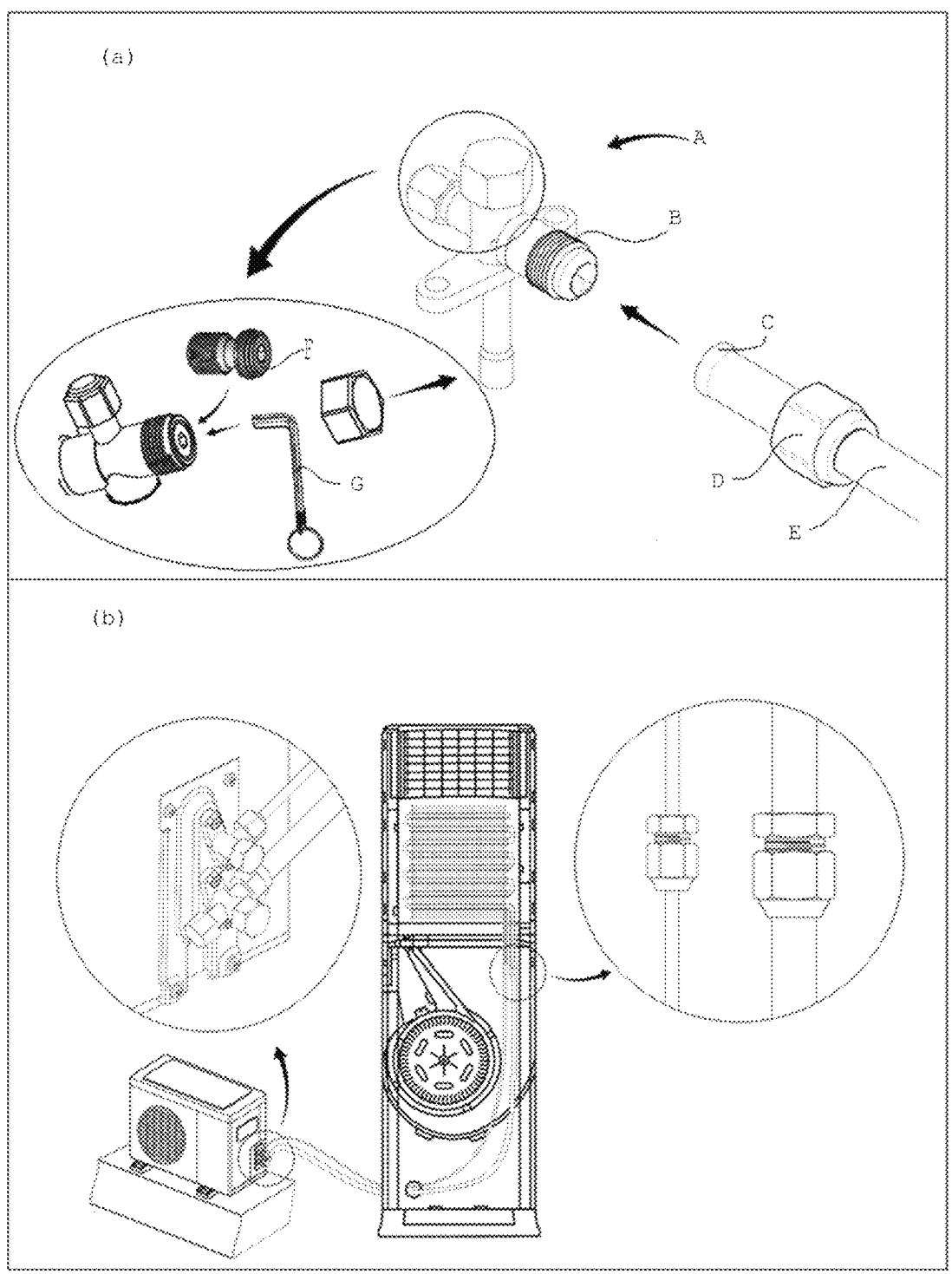
FIGS. 2(a) and 2(b) are exemplary views illustrating a conventional service valve and installation thereof.

Hereinafter, exemplary embodiments disclosed herein will be described in detail with reference to the accompanying drawings, but the same or similar elements are assigned the same reference numbers regardless of the reference numerals, and repeated descriptions thereof will be omitted. The suffixes "unit" and "part" or "member" for components used in the following description are given or interchangeably used only considering ease of writing the specification, and do not have meanings or roles distinguished from one another in themselves. In addition, with regard to the embodiments disclosed in the present specification, if descriptions of related known technologies are considered to obscure the gist of the embodiments disclosed herein, detailed descriptions thereof will be omitted. In addition, the accompanying drawings are only for easy understanding of the embodiments disclosed in the present specification, and the technical spirit disclosed in the specification is not limited by the accompanying drawings, and it should be appreciated that all modifications, equivalents and/or substitutions of the present invention are included in the spirit and technical scope of the present invention.

Terms including ordinal numbers such as first and second may be used to describe different components, but the components are not limited by the terms.

The aforementioned terms are used only for the purpose of distinguishing one component from other components.

When a component is said to be "connected" or "coupled" to another component, it is understood that a component may be directly connected to or coupled to another component but a different component may also exist therebetween. On the other hand, when a component is said to be "directly connected" or "directly coupled" to another component, it should be understood that no other component exists therebetween.

Singular expressions may include plural expressions unless the context clearly indicates otherwise.

In this specification, although terms such as "comprises" or "have" are intended to indicate that there are features, numbers, steps, operations, components, parts, or combinations thereof described in the specification, it should be appreciated that possibilities of existence or addition of one or more other features, numbers, steps, operations, components, parts, or combinations thereof are not excluded in advance.

Figure 3:
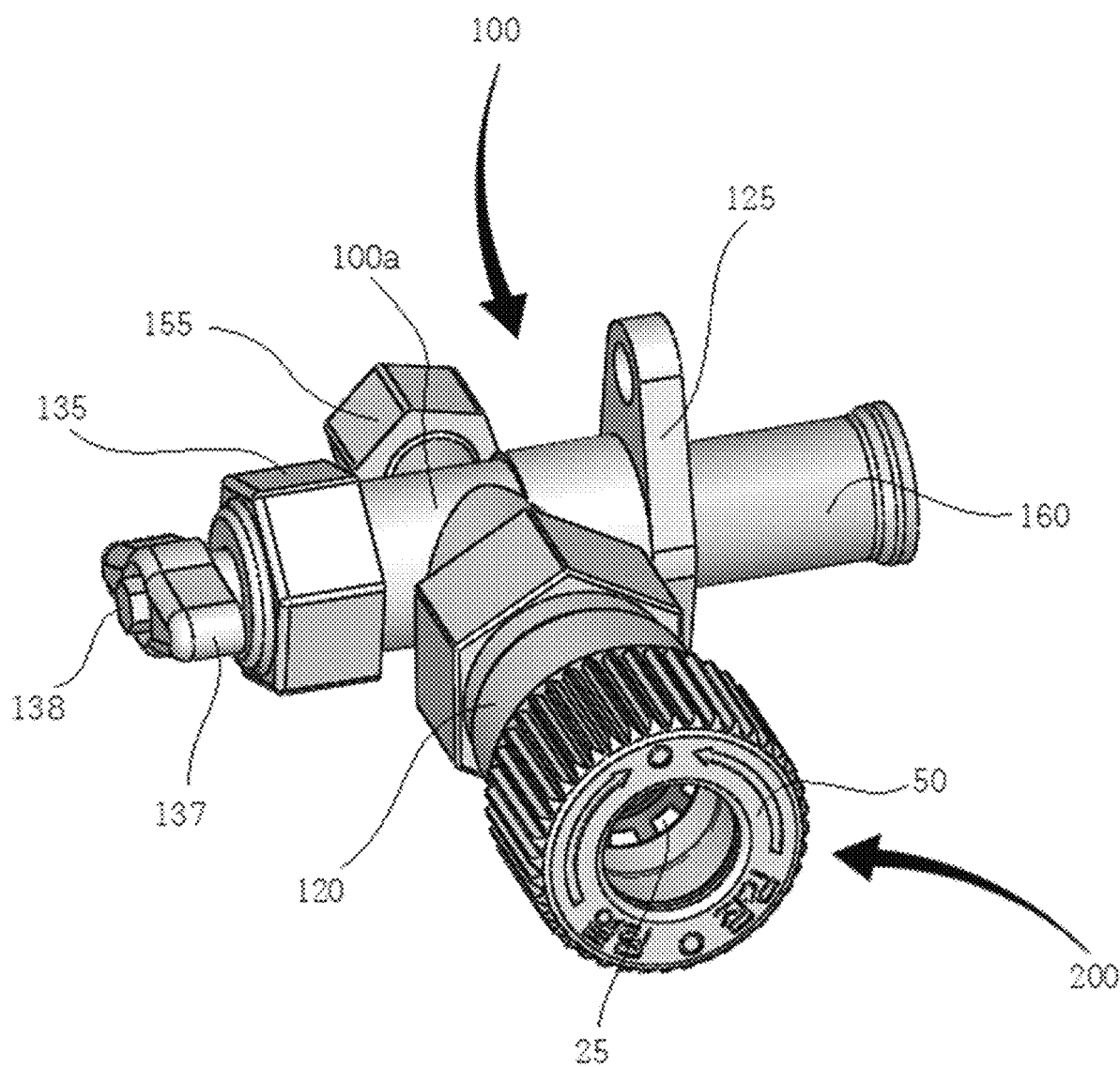
FIG. 3 illustrates overall appearance of a service valve including a fitting device according to an embodiment of the present invention.

FIG. 3 illustrates overall appearance of a service valve including a fitting device according to an embodiment of the present invention. As shown in FIG. 3, a fitting device 200 is fastened to one end of the service valve unit 100, wherein a pipe may be installed on the fitting device 200, more particularly, may be inserted into a pipe inlet of a fitting housing 120, and one end of the fitting housing 120 may be fastened to the service valve unit 100 having a valve handle 137 exposed to the outside. Regarding various appearances from different perspectives, FIGS. 11(a), 11(b), 11(c), and 11(d) show a front, right-side, plane, and left-side view, respectively, of the service valve including the fitting device.

For reference, a base 125 integrally formed with a valve housing 100a illustrated in FIG. 3 may be attached to the outside of an outdoor unit, and a copper pipe 160 may be connected to a coupler of a compressor.

The fitting device according to one embodiment of the present invention may of course be widely employed in general hydraulic/pneumatic applications or injection fitting applications other than a refrigerating machine.

Figure 6:
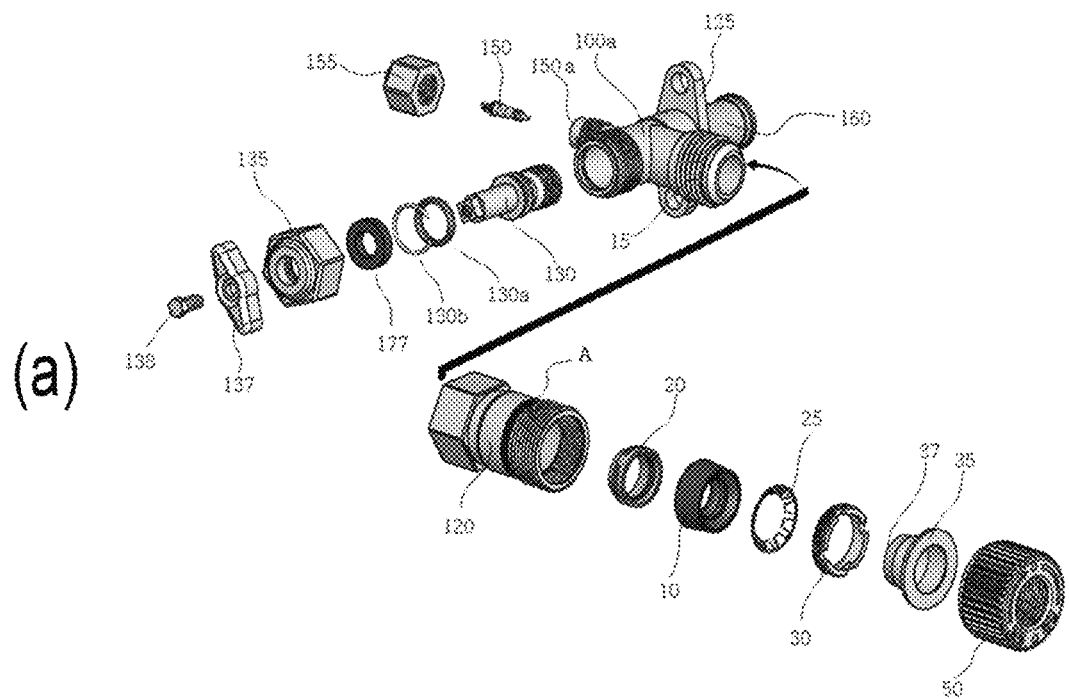
FIG. 6(a) is an exploded perspective view of the service valve including a fitting device.
FIG. 6(b) illustrates a service valve provided with the fitting device according to an embodiment of the present invention.
Figure 6:
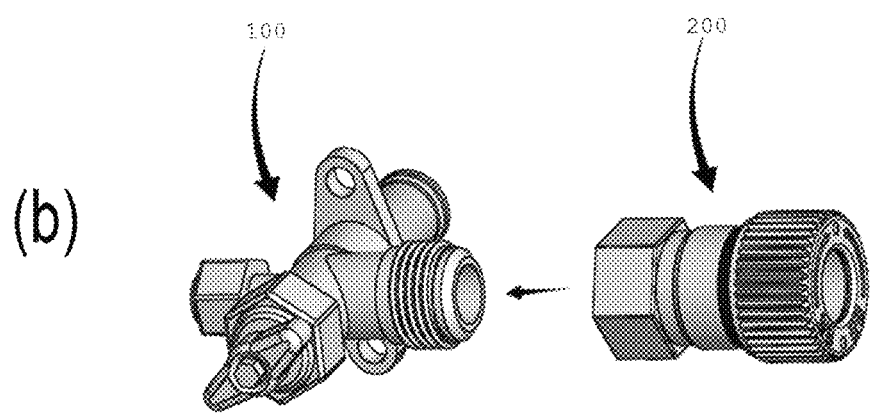

FIG. 6(a) is an exploded perspective view of the service valve including a fitting device according to an embodiment of the present invention, and FIG. 6(b) illustrates a service valve provided with a fitting device.

As shown in FIGS. 6(a) and 6(b), the valve housing 100a may be fastened with a valve nut 130 on one side thereof. That is, a thread formed on an inner bore of a coupler formed in one direction of the valve housing 100a is mutually engaged and fastened with another thread formed on an outer ring at one end of the valve nut 130, so that the valve nut 130 is fitted into the valve housing 100a to be installed.

A circular groove may be formed along an outer circumference in the middle of the valve nut 130, and a valve packing 130a may be fitted into the circular groove. A ring-shaped guide washer pin 130b which is partially opened may be fitted into a C-shaped groove at an end of the inner bore of the coupler formed in one direction of the valve housing 100a.

In addition, a nut stopper 135 may be fastened while turning around the outer thread at the end of the valve housing 100a such that the valve nut 130 protruding outwardly penetrates a hollow part. Further, a valve stopper packing 177 may be interposed between the nut stopper 135 and the valve nut 130.

The end portion protruding outwardly through the hollow part of the nut stopper 135 has a square shape and is provided with a thread groove on an outer surface thereof, and a handle screw 138 is fastened in the thread groove in a state in which a valve handle 137 having a square groove is fitted, so that the valve nut 130 may rotate in correspondence with rotation of the valve handle 137.

After a pin nut 150 is fitted into a fluid (GAS) inlet 150a of the valve housing 100a, a fluid stopper nut 155 may be fastened by turning the outer thread of the fluid (GAS) inlet 150a. When the fluid (GAS) is introduced, the pin nut 150 may be pressed by an injection nut to introduce the fluid.

Figure 7:
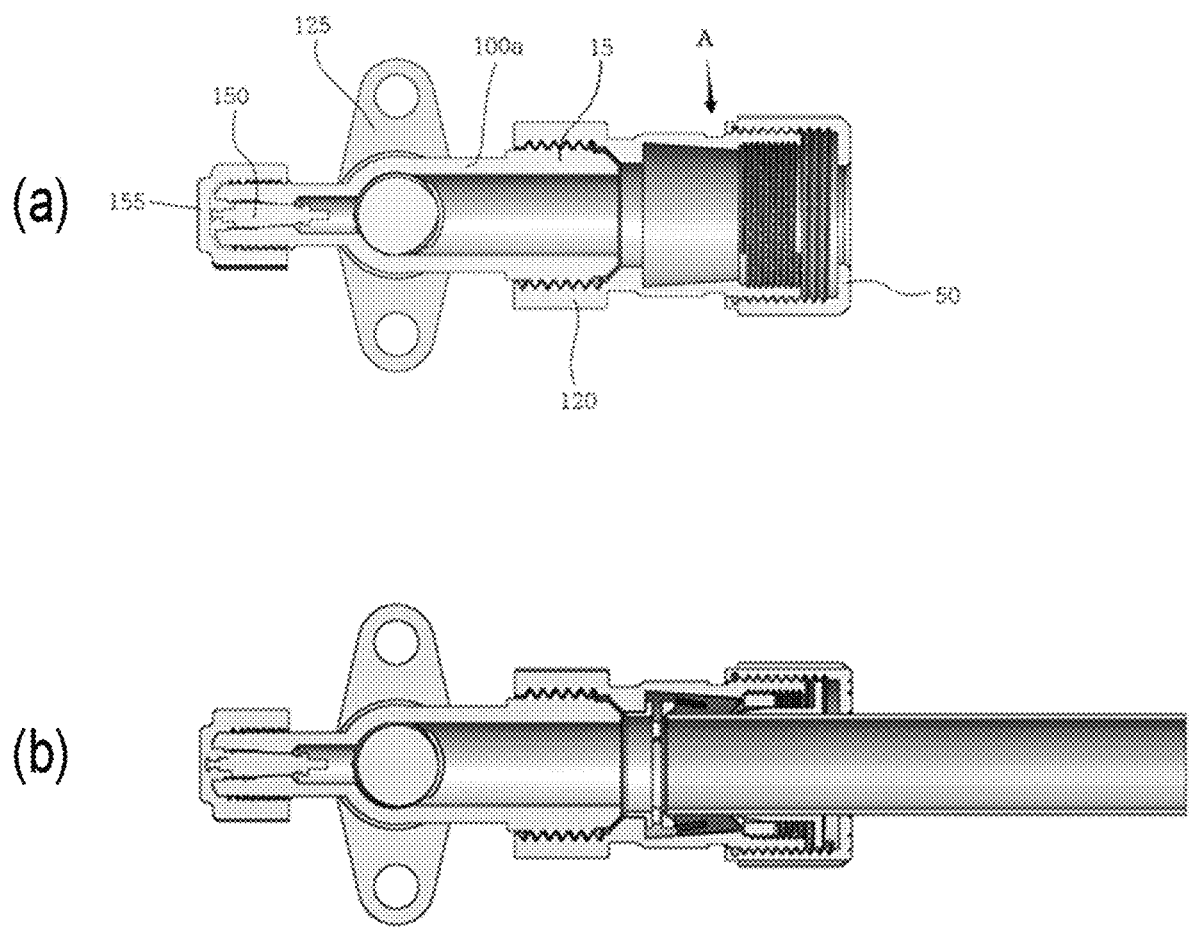
FIGS. 7(a) and 7(b) are cross-sectional views of the service valve including a fitting device according to an embodiment of the present invention.

Meanwhile, the fitting housing 120 may be fastened to a coupler provided in one direction of the valve housing 100a, as shown in FIG. 3. According to a specific embodiment, the coupler in one direction of the valve housing 100a may consist of a nipple 15 and, in order to be coupled to the nipple 15, one end of the fitting housing 120 may have an inner bore formed with a thread by a predetermined length corresponding to the nipple 15 (see FIGS. 7(a) and 7(b) and the like). FIG. 7(a) is a cross-sectional view of the service valve including a fitting device, while FIG. 7(b) is a cross-sectional view of the service valve including a fitting device with a pipe inserted.

On an outer ring at the other end of the fitting housing 120, an outer thread may be formed by a predetermined length, to which a cap handle 50 having a thread corresponding to the inner side may be screw-fastened. Herein, the cap handle 50 may include a thru-hole formed as an entrance in the center portion, through which a pipe 165 is inserted to penetrate the center portion. An outer ring of the cap handle may be formed in a sawtooth shape to be easily turned by a hand.

An inner bore of the cap handle 50 may be engaged and fastened with the outer thread of the fitting housing 120, wherein an end of the cap handle 50 is preferably folded by means of press processing to be caught on the outer thread of the protruding fitting housing 120, thus preventing the cap handle 50 from being released from the fitting housing 120.

Among the terms used in this specification, one end of the fitting housing 120 refers to an end of the fitting housing 120, to which the valve housing 100a is coupled. On the other hand, the other end of the fitting housing 120 refers to an opposite end thereof, to which the cap handle 50 is coupled.

Figure 10:
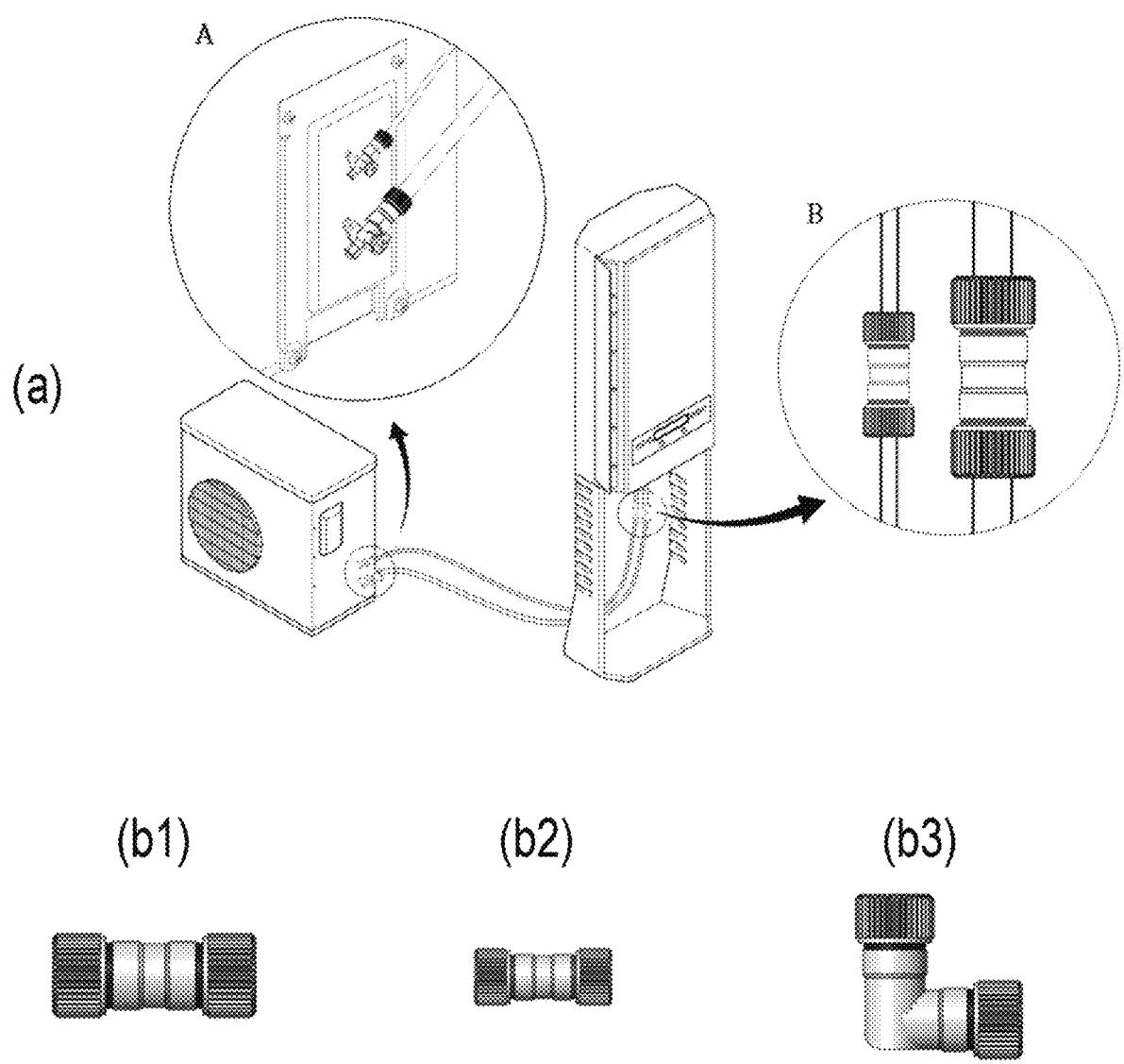
FIG. 10(a) is an exemplary view illustrating the installation of the service valve including a fitting device with a variety of shapes shown in FIGS. 10(b1), 10(b2), and 10(b3) according to an embodiment of the present invention.
Figure 11:
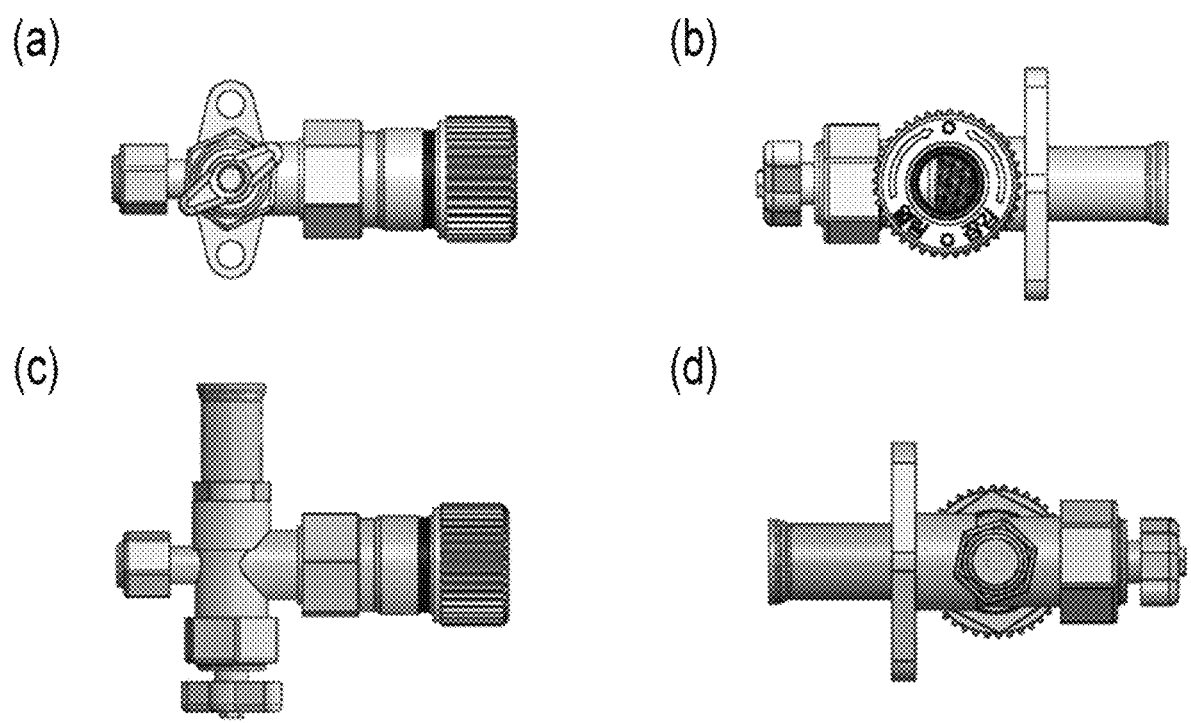
FIGS. 11(a), 11(b), 11(c) and 11(d) illustrates a front view, a right-side view, a plan view, and left-side view of the service valve including a fitting device according to an embodiment of the present invention, respectively.

The fitting housing 120 may be formed in a straight tubular shape, however, the present invention is not limited thereto. Instead, as shown in FIGS. 10(a), 10(b1), 10(b2), and 10(b3), a variety of shapes such as an L-shape, a Y-shape, etc. may also be applied. FIGS. 10(b1), 10(b2) and 10(b3) show examples of fitting devices in various implementations. FIG. 10(a) is a view illustrating the installation of a fitting device and a service valve that includes the fitting device, where part "A" illustrates the installation of the service valve, while part "B" illustrates the installation of the fitting device.

A sleeve 35 may be fitted into the other end of the fitting housing 120, and the sleeve 35 may move forward or backward according to rotation of the cap handle 50.

As shown in FIGS. 6(a) and 6(b) and the like, the sleeve 35 may include: a tubular sleeve body with an outer diameter corresponding to an inner diameter of the ring lock washer spring 25; and a wing part with an outer diameter corresponding to the outer diameter of the other end of the fitting housing 120. Herein, one end of the sleeve body may have a sharp-tapered shape 37 while the wing part may be extended to be bent outwardly from the other end of the sleeve body.

Figure 8A:
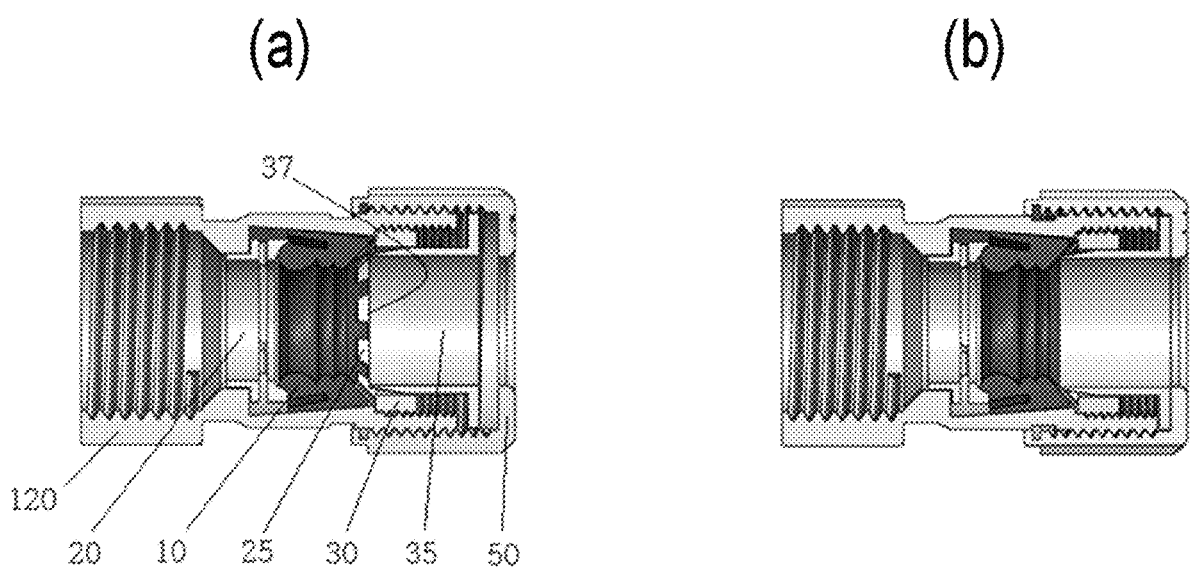
FIGS. 8a(a) and 8a(b) are cross-sectional views of a fitting device according to an embodiment of the present invention.

As shown in FIGS. 8a(a) and 8a(b) and the like, the sleeve 35 may be installed such that the sleeve body is inserted into the other end of the fitting housing 120 and the wing part spans the other end of the fitting housing 120.

Figure 9:
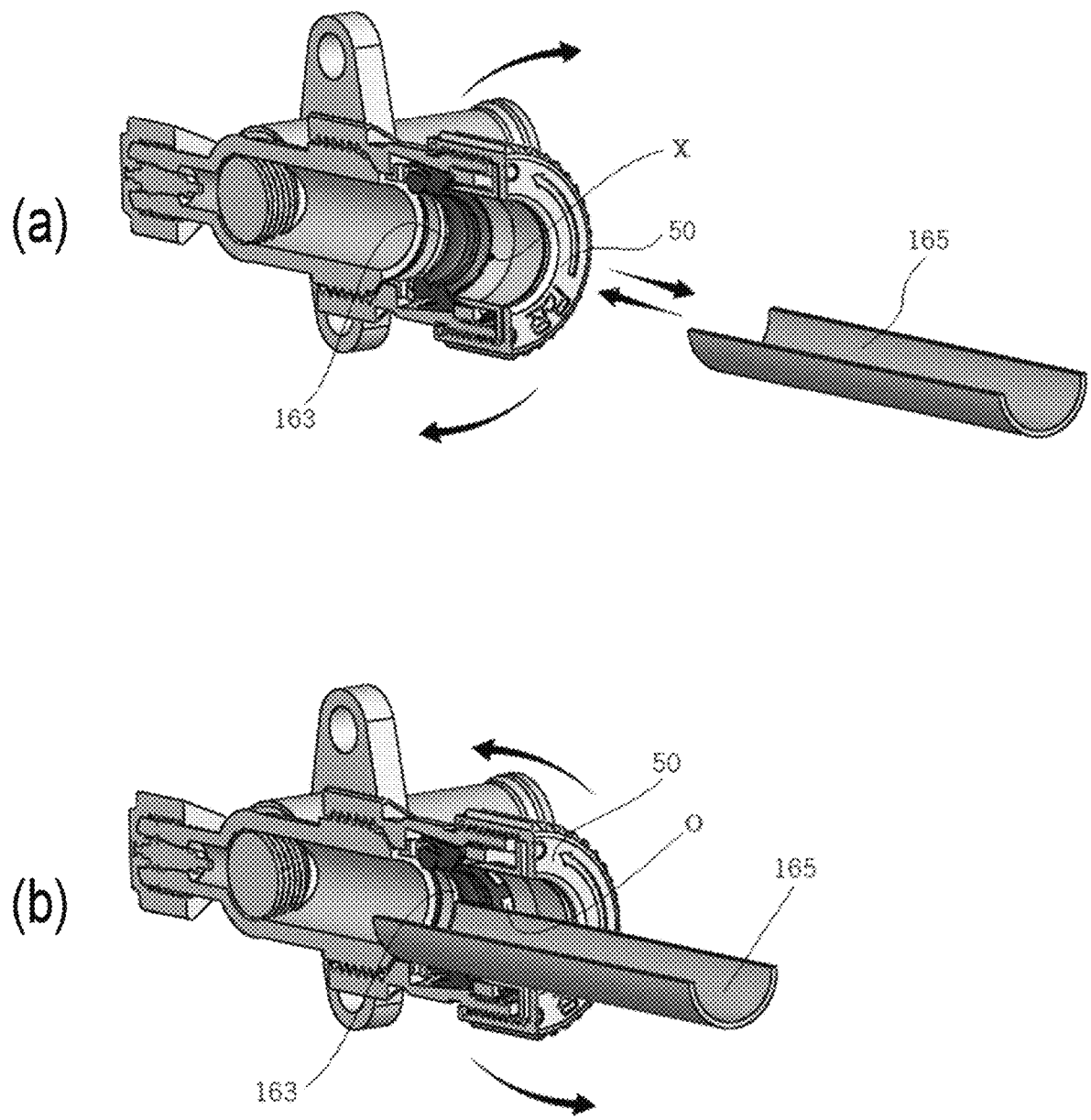
FIGS. 9(a) and 9(b) are perspective cross-sectional views of the service valve including a fitting device according to an embodiment of the present invention.

Accordingly, when the cap handle 50 rotates in an unlocking direction and moves toward the fitting housing 120, the wing part of the sleeve 35 is pressed toward the fitting housing side 120 and the sleeve body 37 of the sleeve 35 may expand teeth formed along a circumference of the inner bore of the ring lock washer spring 25 (see FIG. 9(a)).

On the contrary, when the cap handle 50 rotates in a locking direction and moves away from the fitting housing 120, the wing part of the sleeve 35 is not pressed toward the fitting housing side 120 but retracts the sleeve 35 by elastic force of the ring lock washer spring 25 and, at the same time, the inner bore of the ring lock washer spring 25 may be closed to reduce the inner diameter (see FIG. 9(b)).

To this end, a length of the sleeve body may be defined such that, when the sleeve 35 is pressed toward the fitting housing 120, a front end of the sleeve 35 reaches the tapered tooth portion of the ring lock washer spring 25.

In this case, in order to move the sleeve 35 forward or backward whenever the cap handle 50 moves forward or backward, the cap handle 50 may be formed integrally with the sleeve 35 or may be attached to the sleeve 35.

The ring lock washer spring 25 positioned in front of the sleeve 35 may include a first inner boss protruding at a predetermined depth from the other end of the fitting housing 120 so as to expand the inner bore without being pushed by a pressure of the sleeve 35.

On the first inner boss, the ring lock washer spring 25, specifically, a periphery of the ring lock washer spring 25, is seated, wherein teeth formed on the inner bore of the ring lock washer spring 25 may be arranged to be tapered in a direction parallel to a pressing direction of the sleeve 35 by the cap handle 50.

On the other hand, according to an embodiment of the present invention, the fitting housing 120 may include an inner thread formed by a predetermined length on the inner bore at the other end, and the first inner boss may protrude from the innermost side of the inner thread and the ring lock washer spring 25 is preferably seated on the first inner boss.

At this time, a guide ring nut 30 is preferably screwed to the inner thread so as to press/fix the periphery of the ring lock washer spring 25 seated on the first inner boss.

Accordingly, the ring lock washer spring 25 seated on the first inner boss is interposed between the first inner boss and the guide nut 30, so that the guide nut 30 tightened along the inner thread may rigidly fix the ring lock washer spring 25. As a result, even when the sleeve 35 is inserted into or released from the inner bore of the ring lock washer spring 25, the ring lock washer spring 25 may not move but maintain the original position thereof.

Of course, the sleeve 35 penetrates a hollow part or an inner bore of the guide ring nut 30, and the sleeve 35 may not move forward or backward without interference with the guide ring nut 30.

Meanwhile, the fitting housing 120 may further include a second inner boss protruding at a predetermined depth from the first inner boss in the direction of the service valve unit 100.

The support ring 20 is seated on the second inner boss wherein the support ring 20 is in contact with an end of the inserted pipe 165 to prevent the pipe 165 from further entering the service valve side 100.

Figure 8B:
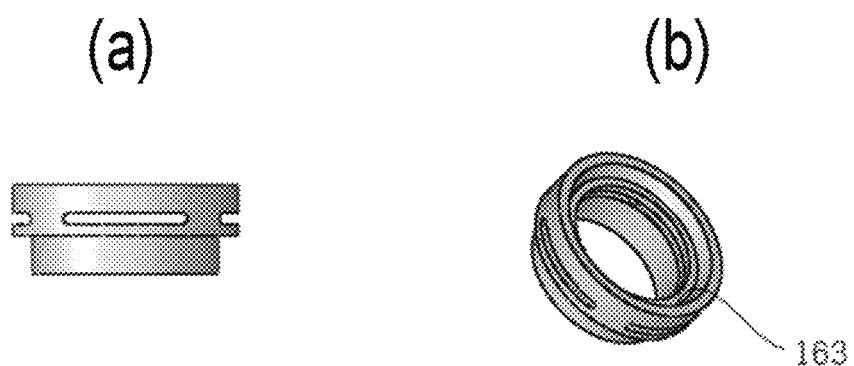
FIGS. 8b(a) and 8b(b) illustrates a support ring according to an embodiment of the present invention.

Although not specifically defined, the support ring may include a stepped part 163 to seat the support ring on the second inner boss, and a tubular diameter of the support ring 20 may be different before and after the stepped part 163. FIG. 8b(b) is a perspective view of the support ring.

In addition, the support ring 20 may include at least one gas inlet perforated on an outer circumference of the support ring, wherein a space is present in the gas inlet in order to guide gas passing through the gas inlet to a gas compression groove of the rubber packing 10 to be described later. FIG. 8b(a) illustrates the support ring as viewed from one side.

Figure 13A:
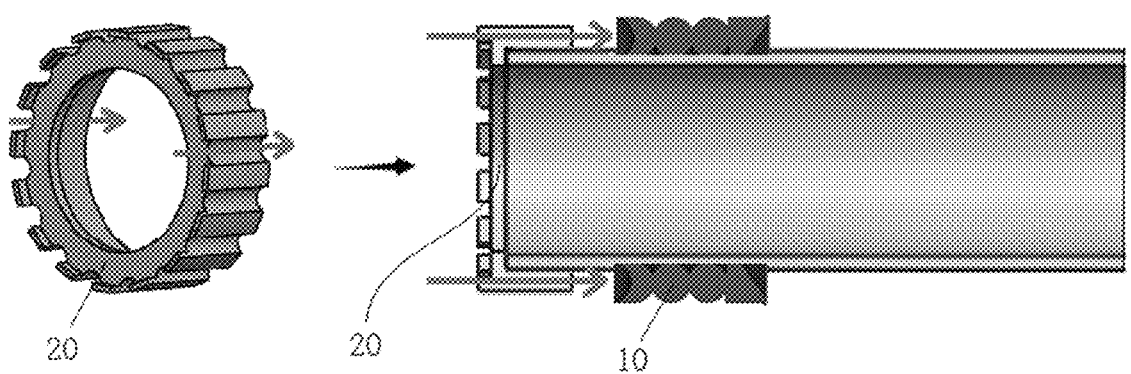
FIG. 13a illustrates a support ring according to another embodiment of the present invention.

The gas inlet may be perforated and formed on the outer circumference of the support ring 20. However, according to another embodiment, as shown in FIG. 13a, the gas inlet may comprise at least one groove formed in a length direction around the outer circumference of the support ring 20. As shown in FIG. 13c, the gas inlet through which the fluid enters may be formed around an outer periphery of the support ring 20, thus easily manufacturing the support ring 20 while reducing production cost.

Figure 13B:
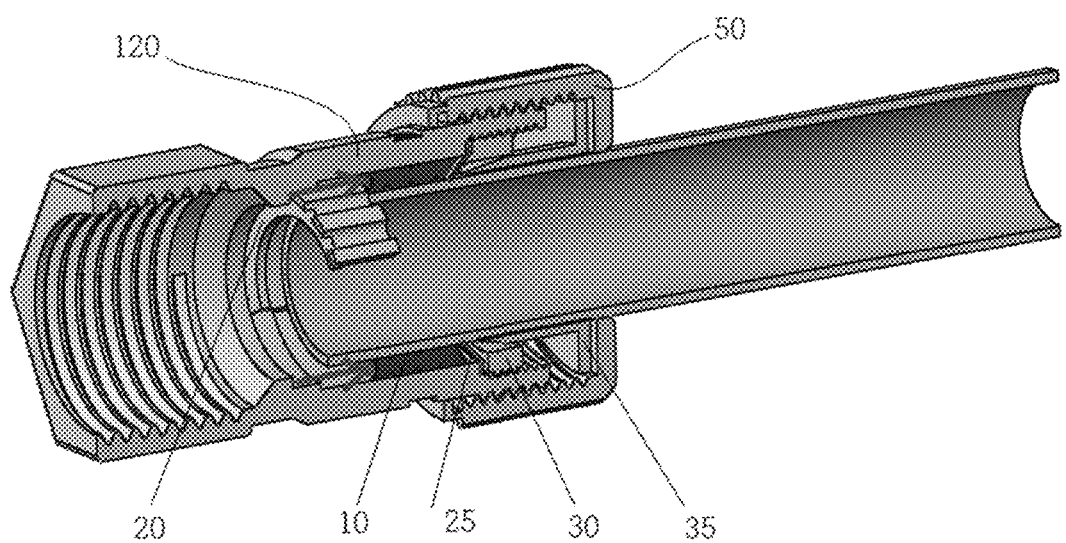
FIG. 13b and FIG. 13c illustrate a state in which the support ring in FIG. 13a is mounted on the fitting device.
Figure 13C:
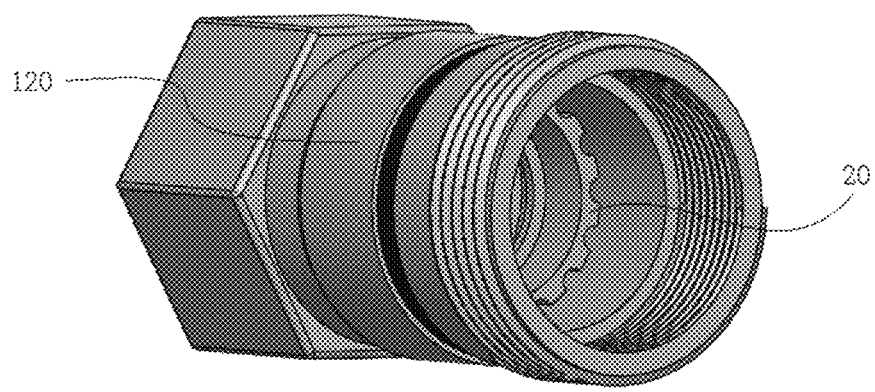

In this case, the fluid flowing through the gas inlet formed in a length direction of the outer circumference of the support ring 20, as shown in FIG. 13b, may directly/indirectly press the rubber packing 10 and the ring lock washer spring 25 in order, and therefore, fastening force between the ring lock washer spring 25 and the pipe 25 may be increased.

The rubber packing 10 may be interposed between the support ring 20 and the ring lock washer spring 25.

At this time, a portion where the rubber packing 10 is installed, that is, a region from the second inner boss to the first inner boss of the fitting housing 120 may have a tapered shape to be gradually narrowed. Accordingly, the rubber packing 10 made of an elastic material may also have an outer ring in a tapered tubular shape that becomes narrower toward the first inner boss.

Further, a gas compression groove is preferably formed on a thickness surface of one end of the rubber packing 10, that is, on the end facing the second inner boss.

Accordingly, some of the gas introduced through the gas inlet of the support ring 20 may press the rubber packing 10 toward the ring lock washer spring 25 with reference to the gas compression groove as an operating point. By pressing the rubber packing 10, the rubber packing 10 may be compressed with the ring lock washer spring 25 so as to improve air-tightness between the rubber packing 10 and the ring lock washer spring 25.

For this purpose, more preferably, a thickness surface of the other end of the rubber packing 10, that is, the end facing the ring lock washer spring 25, is tapered to be in contact with teeth protruding to be tapered in the ring lock washer spring 25, so as to have a concave shape.

Hereinafter, a process of operating the fitting device according to an embodiment of the present invention will be described.

As shown in FIG. 9(a), for example, when the cap handle 50 is turned to the right, that is, in the unlocking state, the end 37 of the sleeve 30 expands the teeth in the inner bore of the ring lock washer spring 25 by the cap handle 50, as in the unlocking state shown in FIG. 8a(b), and therefore, the pipe 165 may be inserted without scratching an outer circumference of the pipe. Herein, the stepped part 163 formed on the inner bore of the support ring 20 inhibits further entry of the pipe 165, whereby the end of the pipe 165 inserted into the fitting device 200 may contact the stepped part 163. FIG. 8a(b) is a cross-sectional view of the fitting device in an unlocked state.

As shown in FIG. 9(b), for example, when the cap handle 50 is turned to the left, that is, in the locking state, the sleeve 30 retracts to reduce a diameter of the expanded inner bore of the ring lock washer spring 25 by the cap handle 50, as in the locking state shown in FIG. 8a(a), and therefore, the teeth are closed to bite the pipe 165 and the pipe 165 may be firmly fixed. FIG. 8a(a) is a cross-sectional view of the fitting device in a locked state.

In this regard, a rotational direction for moving the cap handle 50 forward and backward may be determined along a direction of threads formed between the cap handle 50 and the fitting housing 120, and the present invention does not particularly limit the direction of the threads between the cap handle 50 and the fitting housing 120.

Figure 8C:
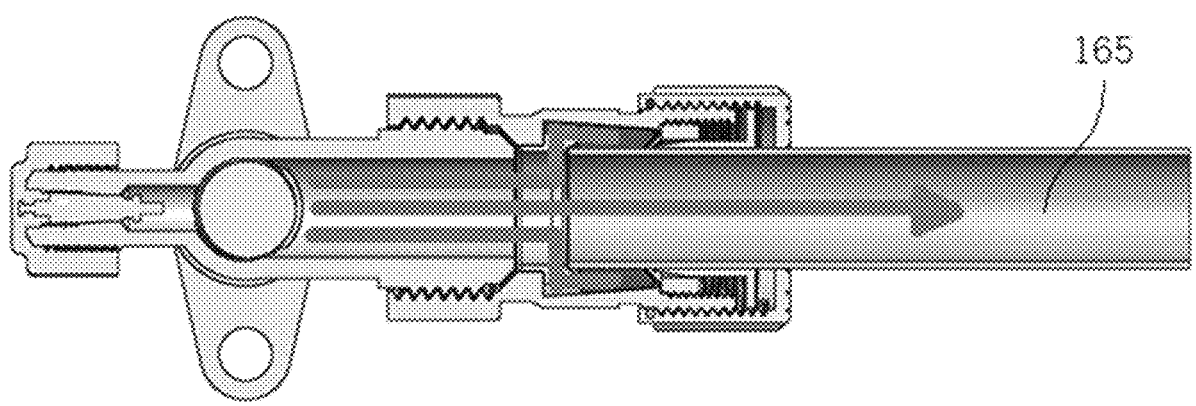
FIG. 8c is a gas flow diagram of the service valve including a fitting device according to an embodiment of the present invention.

At this time, when the gas fluid flows, as shown in FIG. 8c, the gas fluid may pass through the gas inlet formed on the outer circumference of the support ring 20 (for example, formed in each of four directions) and press the gas compression groove of the rubber packing 10, whereby the rubber packing 10 may be compressed with the ring lock washer spring 25. Herein, due to the tapered inner bore of the fitting housing 120 in which the rubber packing 10 is inserted, the periphery of the ring lock washer spring 25 may be further air-tightened. The higher the gas pressure, the more air-tightening effects can be expected. Since the rubber packing 10 compresses the tapered portion of the ring lock washer spring 25, air-tightening effects may be maximized.

In addition, since the tapered teeth portion of the ring lock washer spring 25 is pressed to the rubber packing 10 by gas while biting the pipe 165, fastening force between the ring lock washer spring 25 and the pipe 165 may be further enhanced.

On the other hand, whether the cap handle 50 is in the unlocking or locking state cannot be visibly checked. Therefore, when a worker turns the cap handle 50 to the right for locking as a habit, there is a serious problem in that the pipe 165 may burst due to gas pressure if the gas maintains a predetermined pressure.

Figure 5:
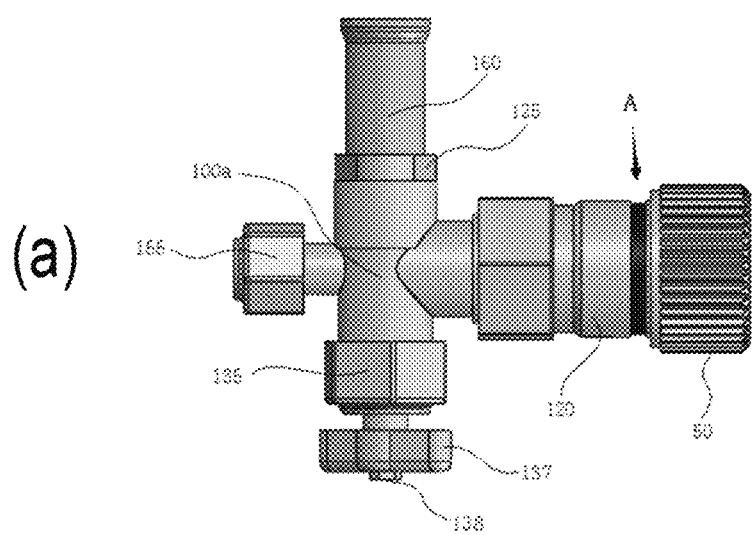
FIGS. 5(a) and 5(b) are plan views of the service valve including a fitting device according to an embodiment of the present invention.
Figure 5:
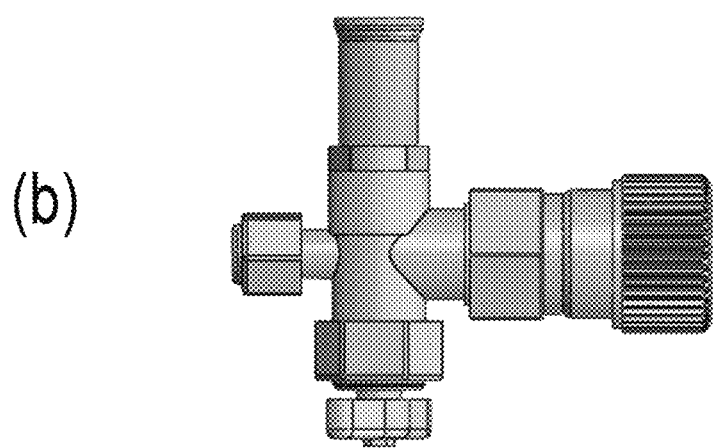

Accordingly, in order to identify the locking or unlocking state of the cap handle 50, as shown in FIGS. 5(a) and 5(b), the fitting housing 120 may have a display unit A on the outer ring. The display unit A is in the form of a colored band, and the color is preferably visible in the locking state while being hidden in the unlocking state by the cap handle 50 to cover the outer ring of the fitting housing 120, whereby the worker can identify the locking state and the unlocking state. FIG. 5(a) illustrates a service valve, including the fitting device in a locked state with a pipe inserted, while FIG. 5(b) illustrates a service valve, including the fitting device in an unlocked state with a pipe inserted.

Figure 4:
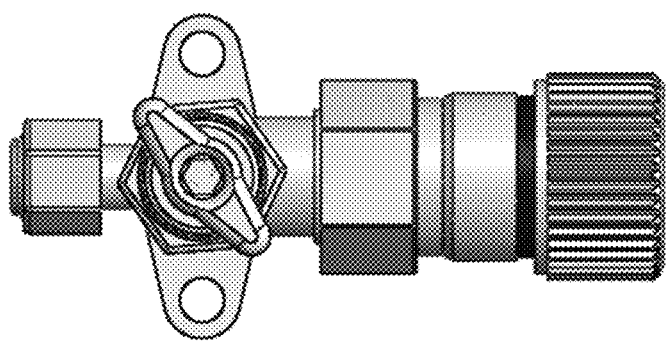
FIGS. 4(a) and 4(b) are front views of the service valve including a fitting device according to an embodiment of the present invention.
Figure 4:
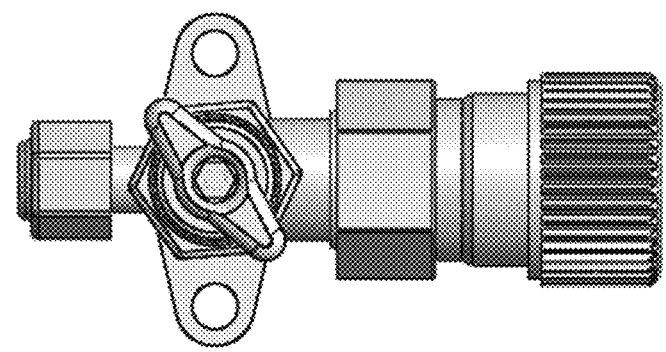

For example, if the display unit A is blue, it may be identified that the cap handle is in the locking state when a blue line is visible while being in the unlocking state when the blue line is invisible. As shown in FIGS. 4(a) and 4(b), the pipe may be inserted in the unlocking state and then switched to the locking state, whereby the pipe 165 can be coupled to the fitting device 200 without damage to an outer surface of the pipe 165. Therefore, a problem of scratching the outer circumference of a pipe when the pipe is inserted into the conventional fitting device may be overcome. FIG. 4(a) illustrates the locked state of the fitting device with a pipe inserted, while FIG. 4(b) illustrates the unlocked state of the fitting device with a pipe inserted.

That is, as shown in FIG. 8a(b) and the like, according to an embodiment of the present invention, the teeth of the ring lock washer spring 25 are expanded in the unlocking state and do not interfere with the inserted pipe, thereby causing no problem as in the prior art.

Further, after coupling the pipe 165 to the fitting device 200, the rubber packing 10 is compressed to the ring lock washer spring 25 by gas pressure. Therefore, the tapered teeth of the ring lock washer sprig 25 are pressed to the pipe 165 to improve fastening force between the ring lock washer spring 25 and the pipe 165.

Meanwhile, with regard to removal of the pipe 165, when dismantling the pipe 165 from the fitting device 200, the valve handle 137 is gradually locked by starting from a high pressure valve. After the gas is fully exhausted, the valve handle 137 is completely locked at a low pressure valve. Then the cap handle 50 is turned to the right to switch the locking state to the unlocking state, thereby separating the pipe 165 without interference with the ring lock washer spring 25.

As such, the preferred embodiments of the present invention have been described above in detail with reference to the accompanying drawings. The description of the present invention is for illustrative purpose only, and those skilled in the art to which the present invention pertains will understand that the present invention may be easily modified into other specific forms without changing the technical spirit or essential features of the present invention.

Figure 12:
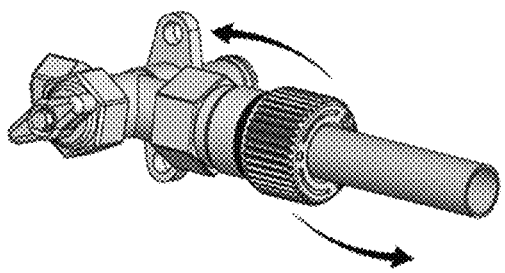
FIG. 12(a) illustrates a state in which a pipe is fastened to the service valve including a fitting device and FIGS. 12(b), 12(c), and 12(d) show the process of removing the pipe from the service valve according to an embodiment of the present invention.
Figure 12:
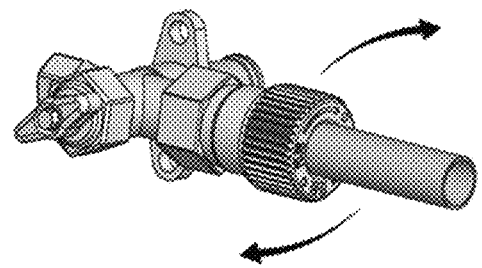
Figure 12:
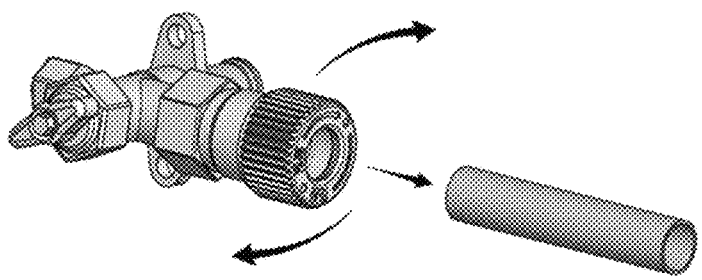
Figure 12:
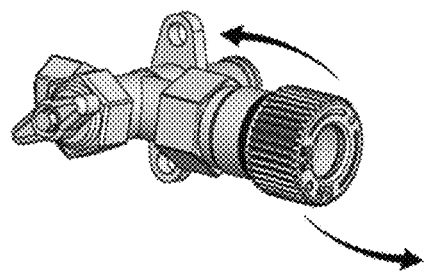

Accordingly, the scope of the present invention is defined by the appended claims, which will be described later, rather than by the detailed description, and it should be interpreted that all modifications or variations derived from the meanings, scope, and equivalent concepts described in the claims are within the scope of the present invention. FIG. 12(a) illustrates a state in which a pipe is fastened to the service valve including a fitting device. FIGS. 12(b) and 12(c) illustrate sequentially the process of removing the pipe from the service valve, and FIG. 12(d) illustrates a state in which a pipe is removed from the service valve including a fitting device.

The invention claimed is:

1. A service valve, comprising a service valve unit and a fitting device provided with a fitting housing coupled to the service valve unit at one end of the fitting housing,
   wherein the fitting device includes:
   a ring lock washer spring in which a pipe is inserted into an inner bore and coupled therein;
   a support ring which is in contact with an end of the inserted pipe to inhibit further entry of the pipe, wherein said support ring has an open bottom and includes at least one perforated gas inlet; and
   a rubber packing interposed between the support ring and the ring lock washer spring, one end of which is tapered to be in contact with teeth protruding to taper the inner bore of the ring lock washer spring,
   wherein the rubber packing is pressed by a fluid introduced through the gas inlet so as to improve air-tightness between the rubber packing and the ring lock washer spring or to increase fastening force between the ring lock washer spring and the pipe.

2. A fitting device, comprising:
   a ring lock washer spring in which a pipe is inserted into an inner bore and coupled therein; a support ring which is in contact with an end of the inserted pipe to inhibit further entry of the pipe, wherein said support ring has an open bottom and includes at least one perforated gas inlet; and a rubber packing interposed between the support ring and the ring lock washer spring, one end of which is tapered to be in contact with teeth protruding to taper the inner bore of the ring lock washer spring, wherein the rubber packing is pressed by a fluid introduced through the gas inlet so as to improve airtightness between the rubber packing and the ring lock washer spring or to increase fastening force between the ring lock washer spring and the pipe.

* * * * *